Patented May 28, 1940

2,202,785

UNITED STATES PATENT OFFICE 2,202,785

PROCESS FOR CONCURRENT FERMENTATIONS BY MEANS OF YEAST AND BUTYL ALCOHOL, PRODUCING BACTERIA

Hugh R. Stiles and Louis M. Pruess, Terre Haute, Ind., assignors to Commercial Solvents Corporation, Terre Haute, Ind., a corporation of Maryland No Drawing. Application November 30, 1936, Serial No. 113,464

4 Claims. (Cl. 195—13)

Our invention relates to the fermentation of molasses mashes prepared from molasses of high sugar content. More specifically our invention relates to an improvement in the process of concurrently fermenting molasses mashes prepared from molasses of high sugar content with yeast and with butyl alcohol producing bacteria of the essentially sugar fermenting type.

It is well known that molasses mashes may be successfully fermented by yeast for the production of ethyl alcohol and that such mashes may be prepared from high sugar molasses, i. e., molasses containing at least 65% total sugar in terms of sucrose. For this purpose any of the ordinary types of molasses distillery yeasts may be employed, such as Saccharomyces cerevisiae strains 4109, 4111, 4124, 4125 and 4132 of the American Type Culture Collection. It is likewise known that molasses mashes may be successfully fermented by butyl alcohol producing bacteria of the essentially sugar fermenting type. These bacteria differ from the essentially starch fermenting bacteria, such as Clostridium acetobutylicum (Weizmann) in their ability to consistently produce higher yields of solvents from nutrient glucose mashes than from mashes consisting solely of grain meal and water. As examples of bacteria of this type there may be mentioned the Clostridium propyl butylicum group described in co-pending application Ser. No. 650,036 by J. Muller and D. A. Legg, the Clostridium inverto acetobutylicum described in co-pending application Ser. No. 675,458 by D. A. Legg and H. R. Stiles, Patent No. 2,089,562, issued August 10, 1937 the Clostridium saccharo acetobutylicum group described in co-pending application Ser No. 675,459 by J. C. Woodruff, H. R. Stiles, and D. A. Legg, Patent No. 2,089,522, issued August 10, 1937 the beta and gamma species of the latter group described in U. S. Patent No. 2,050,219 by C. F. Arzberger, Clostridium saccharo butylicum-γ of U. S. Patent 1,908,361, and Clostridium saccharo butyl acetonicum of U. S. Patent 1,992,921. Various other species of this general group are well known to those skilled in the art. It is apparent that molasses mashes for fermentation by bacteria of this type may also be prepared from molasses of high sugar content.

In a commercial fermentation plant two or more types of fermentations are often carried out concurrently and a combination of ethyl and butyl fermentations is often carried out in this manner. We have now discovered that in the case of concurrent ferementation of molasses mashes prepared from molasses of high sugar content by means of yeast and butyl alcohol producing bacteria of the type described above, improved results can be secured by utilizing the distillation slop from one type of fermentation as a partial source of nutrient for the other type of fermentation. We have found that by this method a definite increase in yield is obtained in the fermentation to which the slop is thus supplied. We have further found that in a process of this nature the distillation slop from the first fermentation to which slop was supplied may be utilized for the subsequent fermentation by the other type of microorganisms, and that this procedure may be continued for a number of stages without inhibitory effects upon the fermentations. It may be seen that this method of "criss-cross slopping back" is highly advantageous from the standpoint of reducing the amount of total distillation slop from a given plant, thus lessening the problem of waste disposal. Other advantages of our process such as reduction in the amount of nutrients required, and the like, will be evident from the following description and specific examples.

Our invention is applicable to any process in which molasses mashes prepared from high sugar molasses are concurrently fermented by yeast and by bacteria of the type above described. The particular composition of the wash is not critical, and optimum mashes may be used for the particular microorganisms employed. The amount of distillation slop from one type of fermentation to be used in the mash for the other type will, of course, vary somewhat, depending upon the nature of the molasses used and whether or not a single cross slopping is to be used or "criss-cross slopping back" is to be employed. In general, a somewhat higher concentration of slop may be utilized in the former procedure than in the latter. However, in either case a concentration of the order of 15% by volume for the butyl fermentation and of the order of 25% by volume for the ethyl fermentation will be found to be satisfactory. Optimum concentrations in any given case can readily be determined by simple preliminary experiments. If "criss-cross slopping back" is employed, this procedure may be carried out for at least 3 stages without any undesirable effects, and in any case may be continued until inhibitory effect upon one or the other fermentation is noted.

Our invention may be illustrated by the following specific examples:

Example I

A molasses of 75.5% sugar concentration was utilized to prepare mashes containing the amounts of sugar, nutrients, and slop shown below. The ethyl alcohol mashes were fermented with a molasses type distillery yeast, and the butyl alcohol mashes were fermented with a culture of *Clostridium saccharo-acetobutylicum-α*. The results are shown in the following table:

| No. | Type of fermentation | Sugar G/L | Nutrients G/L | Slop Ml/L | Source of slop | Yield percent of sugar |
|---|---|---|---|---|---|---|
| 1 | Butyl alcohol | 50 | 2.5 $(NH_4)_2SO_4$ <br> 2.8 $CaCO_3$ | 0 | -------- | 30.8 |
| 2 | Ethyl alcohol | 143 | 1.5 $(NH_4)_2SO_4$ <br> 0.25 $MgSO_4.7H_2O$ <br> 0.35 $CaH_4(PO_4)_2$ | 0 | -------- | 44.0 |
| 3 | Butyl alcohol | 50 | 2.5 $(NH_4)_2SO_4$ <br> 2.8 $CaCO_3$ | 150 | No. 2 | 32.8 |
| 4 | Ethyl alcohol | 143 | 1.0 $(NH_4)_2SO_4$ <br> 0.05 $MgSO_4.7H_2O$ <br> 0.05 $CaH_4(PO_4)_2$ | 250 | No. 3 | 44.1 |
| 5 | Butyl alcohol | 50 | 2.5 $(NH_4)_2SO_4$ <br> 2.8 $CaCO_3$ | 150 | No. 4 | 32.7 |

*Example II*

A molasses of 75.5% sugar concentration was utilized to prepare mashes containing the amounts of sugar, nutrients, and slop shown below. The ethyl alcohol mashes were fermented with a molasses type distillery yeast, and the butyl alcohol mashes were fermented with a culture of *Clostridium saccharo-acetobutylicum-α*. The results are shown in the follow table:

| No. | Type of fermentation | Sugar G/L | Nutrients G/L | Slop Ml/L | Source of slop | Yield percent of sugar |
|---|---|---|---|---|---|---|
| 1 | Butyl alcohol | 50 | 2.5 $(NH_4)_2SO_4$ <br> 2.8 $CaCO_3$ <br> 0.08 $CaH_4(PO_4)_2$ | 0 | -------- | 31.2 |
| 2 | Ethyl alcohol | 143 | 1.5 $(NH_4)_2SO_4$ <br> 0.33 $MgSO_4.7H_2O$ | 0 | -------- | 44.2 |
| 3 | Butyl alcohol | 50 | 2.5 $(NH_4)_2SO_4$ <br> 2.8 $CaCO_3$ | 150 | No. 2 | 33.8 |
| 4 | Etyhl alcohol | 143 | 1.5 $(NH_4)_2SO_4$ <br> 0.25 $MgSO_4.7H_2O$ | 250 | No. 3 | 45.1 |
| 5 | Butyl alcohol | 50 | 2.5 $(NH_4)_2SO_4$ <br> 2.8 $CaCO_3$ | 150 | No. 4 | 31.4 |

*Example III*

A molasses of 75.5% sugar concentration was utilized to prepare mashes containing the amounts of sugar, nutrients, and slop shown below. The ethyl alcohol mashes were fermented with a molasses type distillery yeast, and the butyl alcohol mashes were fermented with a culture of *Clostridium saccharo-acetobutylicum-α*. The results are shown in the following table:

| No. | Type of fermentation | Sugar G/L | Nutrients G/L | Slop Ml/L | Source of slop | Yield percent of sugar |
|---|---|---|---|---|---|---|
| 1 | Ethyl alcohol | 143 | 1.5 $(NH_4)_2SO_4$ <br> 0.5 $MgSO_4.7H_2O$ <br> 0.5 $CaH_4(PO_4)_2$ | 0 | --- | 44.5 |
| 2 | Butyl alcohol | 50 | 2.5 $(NH_4)_2SO_4$ <br> 2.8 $CaCO_3$ <br> 0.08 $CaH_4(PO_4)_2$ | 0 | --- | 32.3 |
| 3 | Ethyl alcohol | 143 | 0.75 $(NH_4)_2SO_4$ <br> 0.25 $MgSO_4.7H_2O$ <br> 0.25 $CaH_4(PO_4)_2$ | 250 | No. 2 | 45.6 |
| 4 | Butyl alcohol | 50 | 2.5 $(NH_4)_2SO_4$ <br> 2.8 $CaCO_3$ | 150 | No. 3 | 33.4 |

The above examples clearly show the efficacy of slop from mashes prepared from high sugar molasses as a nutrient in the fermentation of such mashes concurrently with yeast and butyl alcohol producing bacteria. A comparison of fermentations 1 and 3 of Example I shows a definite increase in yield in the butyl alcohol fermentation by the use of slop from the ethyl alcohol fermentation, and a comparison of fermentations 1 and 3 of Example III shows a definite increase in yield in the ethyl alcohol fermentation by the use of slop from the butyl alcohol fermentation. All of the examples show the efficacy of "criss-cross slopping back" through a number of stages and likewise show that the amounts of auxiliary nutrients may be somewhat decreased when utilizing slop as an auxiliary nutrient.

It is understood, of course, that the above examples are illustrative only and that our invention is not to be construed as limited to the particular microorganisms, materials or procedures specified. As has previously been pointed out, our invention is applicable generally to the concurrent fermentation of molasses mashes prepared from high sugar molasses by yeast and by the essentially sugar fermenting butyl alcohol producing bacteria. Various modifications in procedure, and the use of any equivalents which would naturally occur to one skilled in the art are to be understood as included within the scope of our invention.

Our invention now having been described what we claim is:

1. In a process for the concurrent fermentation of molasses mashes prepared from molasses of approximately 75% sugar content by yeast and by butyl alcohol producing bacteria of the essentially sugar fermenting type, the improvement which comprises incorporating in the mash for the ethyl alcohol fermentation, distillation slop from the butyl alcohol fermentation in a concentration of the order of 25% by volume.

2. In a process for the concurrent fermentation of molasses mashes prepared from molasses of approximately 75% sugar content by yeast and by butyl alcohol producing bacteria of the essentially sugar fermenting type, the improvement which comprises incorporating in the mash for the butyl alcohol fermentation, distillation slop from the ethyl alcohol fermentation and incorporating in the mash for the ethyl alcohol fermentation, distillation slop from the butyl alcohol fermentation.

3. In a process for the concurrent fermentation of molasses mashes prepared from molasses of approximately 75% sugar content by yeast and by butyl alcohol producing bacteria of the essentially sugar fermenting type, the improvement which comprises incorporating in the mash for the butyl alcohol fermentation, distillation slop from the ethyl alcohol fermentation and incorporating in the mash for the ethyl alcohol fermentation, distillation slop from the butyl alcohol fermentation, and repeating said process through subsequent stages of the concurrent fermentations utilizing in each case distillation slop from the preceding stage to effect "criss-cross slopping back."

4. In a process for the concurrent fermentation of molasses mashes prepared from molasses of approximately 75% sugar content by yeast, and by butyl alcohol producing bacteria of the essentially sugar fermenting type, the improvement which comprises incorporating in the mash for the butyl alcohol fermentation, distillation slop from the ethyl alcohol fermentation and incorporating in the mash for the ethyl alcohol fermentation, distillation slop from the butyl alcohol fermentation, and repeating said process through subsequent stages of the concurrent fermentations utilizing in each case distillation slop from the preceding stage to effect "criss-cross slopping back," said process being repeated for a number of cycles, less than that producing an inhibitory effect upon the fermentations.

HUGH R. STILES.
LOUIS M. PRUESS.